US009743265B2

(12) United States Patent
Kuznetsov

(10) Patent No.: US 9,743,265 B2
(45) Date of Patent: Aug. 22, 2017

(54) SYSTEM AND METHOD FOR PROVIDING INDIVIDUALIZED TSUNAMI NOTIFICATIONS WITH THE AID OF A DIGITAL COMPUTER

(71) Applicant: Namilogica LTD, West Linn, OR (US)

(72) Inventor: Victor Kuznetsov, West Linn, OR (US)

(73) Assignee: Namilogica LTD, West Linn, OR (US)

( * ) Notice: Subject to any disclaimer, the term of this patent is extended or adjusted under 35 U.S.C. 154(b) by 0 days.

(21) Appl. No.: 15/406,531

(22) Filed: Jan. 13, 2017

(65) Prior Publication Data

US 2017/0134923 A1     May 11, 2017

Related U.S. Application Data

(63) Continuation of application No. 14/985,205, filed on Dec. 30, 2015, now Pat. No. 9,548,828.

(60) Provisional application No. 62/099,137, filed on Dec. 31, 2014.

(51) Int. Cl.
*H04M 11/04*   (2006.01)
*H04W 4/22*    (2009.01)
*H04W 4/02*    (2009.01)

(52) U.S. Cl.
CPC ............. *H04W 4/22* (2013.01); *H04W 4/021* (2013.01); *H04W 4/025* (2013.01)

(58) Field of Classification Search
USPC .......................................... 455/404.1, 404.2
See application file for complete search history.

(56) References Cited

U.S. PATENT DOCUMENTS

2012/0271935 A1*  10/2012  Moon ................... G06F 9/5094
                                                              709/224

OTHER PUBLICATIONS

Bernard, E., and V.V. Titov (2015): Evolution of tsunami warning systems and products. Philos. Trans. R. Soc. Lond. A, 373(2053), 20140371, doi: 0.1098/rsta.2014.0371. Retrieved from the Internet: URL: http://rsta.royalsocietypublishing.org/content/373/2053/20140371.
Bernard, E. (2012): Thirteenth Annual Roger Revelle Commemorative Lecture—Tsunamis: Are we underestimating the risk? Oceanography, 25(2), doi: 10.5670/oceanog.2012.60, 208-218.

(Continued)

*Primary Examiner* — Joel Ajayi
(74) *Attorney, Agent, or Firm* — Patrick J. S. Inouye; Leonid Kisselev

(57) ABSTRACT

A system and method for providing individualized tsunami notifications with the aid of a digital computer are provided. A request for a location of a mobile device is received by a mobile application executing on the mobile device. The location is provided to at least one server. A notification of a possible forecasted tsunami impact on an area that comprises the provided location is received via the communication network, the notification comprising a vector line applicable to a map of the area and describing a portion of the area forecasted to be impacted when applied to the map. The vector line is applied to the map and the portion of the area is represented on the map. When the location is forecasted to be impacted is calculated. The representation of the portion of the area and when the location is forecasted to be impacted is represented via the mobile device.

20 Claims, 8 Drawing Sheets

(56) References Cited

OTHER PUBLICATIONS

Titov, V.V. (2009): The Sea, Chapter 12 "Tsunami Forecasting," vol. 15: Tsunamis, Harvard University Press Cambridge, MA and London, England, 371-400.

Titov, V.V., A.B. Rabinovich, H.O. Mofjeld, R.E. Thomson, and F.I. González (2005): The global reach of the Dec. 26, 2004 Sumatra Tsunami . . . Science, 309(5743), 2045-2048. Retrieved from the Internet: URL: http://www.sciencemag.org/content/309/5743/2045.full.

Wei, Y., C. Chamberlin, V. Titov, L. Tang, and E.N. Bernard (2013): Modeling of the 2011 Japan tsunami—Lessons for near-field forecast, Pure Appl. Geophys., 170(6-8), doi: 10.1007/s00024-012-0519-z, 1309-1331. Retrieved from the Internet: URL: http://www.pmel.noaa.gov/public/pmel/publications-search/search_abstract.php?fmContributionNum=3795.

\* cited by examiner

50

60

70

130

120

SYSTEM AND METHOD FOR PROVIDING INDIVIDUALIZED TSUNAMI NOTIFICATIONS WITH THE AID OF A DIGITAL COMPUTER

CROSS-REFERENCE TO RELATED APPLICATION

This non-provisional patent application is a continuation of U.S. patent application Ser. No. 14/985,205, filed Dec. 30, 2015, pending, which claims priority under 35 U.S.C. §119(e) to U.S. Provisional Patent application, Ser. No. 62/099,137, filed Dec. 31, 2014, the disclosures of which are incorporated by reference.

FIELD

This application relates in general to disaster notification, and in particular to a system and method for providing individualized tsunami notifications with the aid of a digital computer.

BACKGROUND

A tsunami is a series of long waves in a body of water, which can flood adjacent and distant coastlines with potentially devastating consequences for the inundated communities. For instance, the 2004 Sumatra tsunami resulted in more than 235,000 deaths and displaced 1.7 million people across 16 countries. Similarly, the Tohoku tsunami that struck Japan on Mar. 11, 2011 is reported to have caused 15,853 casualties, resulted in 3,452 people being declared missing, 6,023 people injured, and over 220 billion dollars in damage.

Tsunami warning systems are crucial to reducing human casualties caused by the tsunamis. These warning systems strive to provide a notification of tsunami danger far enough in advance to allow precautionary steps, including the evacuation of the populace from the affected areas, to be taken. Such systems are on the receiving end of a chain of tsunami reaction activities that begin with the kinds of data that are associated with an event that could trigger a tsunami, such as an underwater or coastal seismic event or other oceanographic disturbances.

In the United States, the National Oceanic and Atmospheric Administration (NOAA) has the primary responsibility over forecasting and monitoring the occurrence of tsunamis. NOAA operates a fleet of oceanographic buoys, known as Deep-ocean Assessment and Reporting of Tsunamis (DART®) stations, and receives seismic data collected by the United States Geological Survey (USGS) and other agencies. NOAA analyzes the data to forecast the occurrence of a tsunami continually updates such forecast as more data becomes available. State-level centers are notified by NOAA if a tsunami threat is deemed likely to occur. Relevant civil authorities review the tsunami notifications and decide how to best act based on the notifications, such as issuing warnings or evacuation orders.

Unfortunately, warnings and orders are not always effective. First, such warnings and evacuation orders are often issued for a large geographic locale, erring on the side of caution by being overly inclusive. If such over-inclusion happens often, residents may doubt the accuracy of such warnings and could even disobey evacuation orders in the orders in the belief that a false alarm exists. Further, such warnings may be incomplete. For example, a tsunami has multiple characteristics, such as wave height, inundation, spread, and arrival time. The degree to which the coastal region may be affected is topologically-specific and that level of specificity is normally omitted from the more populace-oriented warnings of general danger. This lack of specificity can be addressed with actionable location-centric data, yet the various agencies responsible for tsunami response remain focused on high level and conservative warning messages, in part due, to the overriding need to act promptly as well as lack of readily available reliable actionable data.

Accordingly, there is a need for an improved way to provide notifications of a tsunami danger.

SUMMARY

A pinpoint forecast of the possible impact of a tsunami is created by processing near real-time tsunami data, including seismic data or wave data obtained using underwater pressure sensors, bathymetry data of the body of water in which the tsunami occurs, and topographic data of specific locations. Notifications are provided to subscribers via their mobile devices, such as smartphones, smart-watches, tablets, and the like. The forecast presents the notification in a form that is easily understandable and which allows the subscriber to take any appropriate action, such as evacuating to a safe place. The forecast is continually updated as new data becomes available. Disaster response personnel responsible for warning the populace can be similarly notified in a further embodiment. Additional assistance can be provided by activating disaster notification devices, such as sirens, in the specific locations to be impacted. By providing the location-specific notifications and other actionable data, the system and method clarifies precisely where danger due to the tsunami exists on an individual basis and simplifies the evacuation from the affected areas, thus aiding public safety.

In one embodiment, a system and method for providing individualized tsunami notifications with the aid of a digital computer is provided. A request for a location of a mobile device is received by a mobile application executing on the mobile device. The location is provided by the mobile application via a communication network to at least one server. A notification of a possible forecasted tsunami impact on an area that comprises the provided location is received by the mobile application via the communication network, the notification comprising a vector line applicable to a map of the area and describing a portion of the area forecasted to be impacted when applied to the map. The vector line is applied by the mobile application to the map and the portion of the area forecasted to be impacted is represented on the map by the mobile application. When the location is forecasted to be impacted is calculated by the mobile application. The representation of the portion of the area forecasted to be impacted and when the location is forecasted to be impacted is represented via the mobile device by the mobile application.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention.

DETAILED DESCRIPTION

Figure 1:
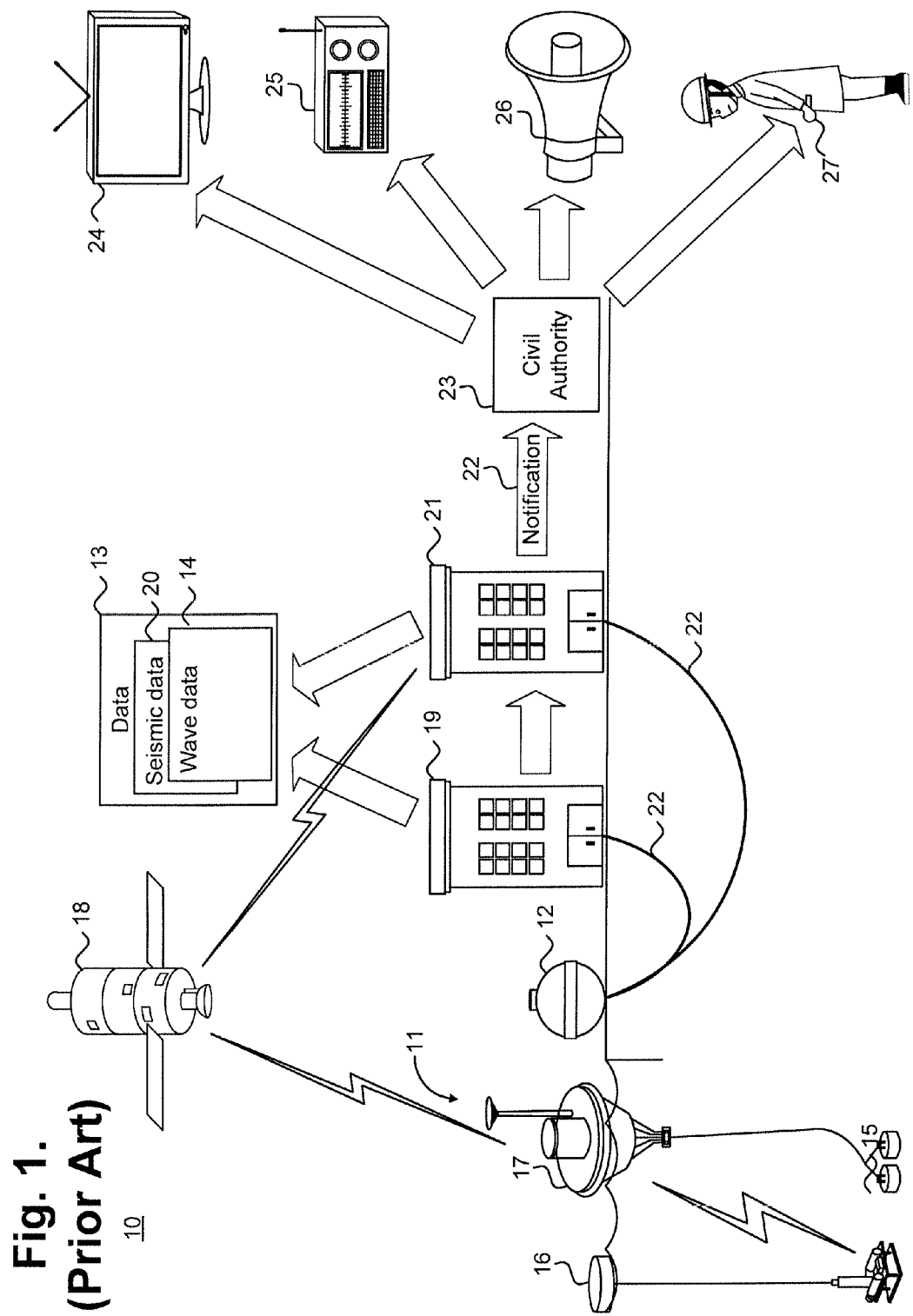
FIG. 1 is a block diagram showing a prior art system for providing tsunami notification warnings.

Conventional tsunami warning systems are structured on an outdated model for notifying the populace of tsunami danger. FIG. 1 is a block diagram showing a prior art system 10 for providing tsunami notification warnings. The system 10 includes sensors 11, 12 for gathering data 13 that is associated with a tsunami. For example, such data 13 can include data 14 regarding the wave dynamics (wave data) that can be collected via an underwater pressure sensor 11 implemented as part of the DART® station system operated by NOAA at multiple locations in the Pacific and Atlantic Oceans. Each of the DART® stations includes an underwater pressure recorder 15 anchored to the seafloor that records water pressure. The pressure recorder 15 is further coupled to a floatation device 16 on which a signal flag (not shown) can be placed to indicate the position of the sensor. The recorder 15 further includes an acoustic modem that communicates with a buoy 17 floating above the recorder. The pressure information reflects wave dynamics above the pressure recorder 15 at the moment of measurement. When the pressure recorder detects an unusually large wave that may be indicative of a tsunami, the buoy 17 uses a satellite communication device to transmit data about the height of the wave when the height exceeds a threshold. The data is sent via a satellite 18 to a processing center 19, which can process the data to forecast whether a tsunami is likely, and if so, with what impact, in terms of landfall wave height, inundation, and time of arrival. Alternatively, the second generation of DART® can be contacted by the processing centers 19 and instructed to start gathering and transmitting data 14 to the processing center if a tsunami is suspected based on other data 13.

Likewise, the system 10 uses seismographs 12 to obtain seismic data 20 regarding underwater seismic events that can be associated with a tsunami, such as underwater earthquakes, volcanic eruptions, and landslides. When a seismic event is an earthquake, such data 20 can include time of the earthquake, the location and magnitude of the earthquake, and the depth of the earthquake, though other kinds of seismic data 20 is possible. The seismographs 12 communicate with at least one processing centers 19, 21 in a variety of ways, such as via fiber optic cables 22, that allow the processing centers to obtain the collected seismic data 20 in near real-time.

The processing centers 19, 21 often share received data. For example, the United States Geological Survey (USGS) runs the Advanced National Seismic System (ANSS), which collects seismic data 20. The information collected by USGS through ANSS is utilized by NOAA in making tsunami forecasts. Likewise, processing centers of a single agency can directly obtain multiple kinds of data. For example, NOAA also receives directly from seismographs 12 that NOAA operates. In addition, the processing centers, make the obtained data 13, such as the seismic data available to the public, such as via the websites of the organizations whose processing centers 19, 21 receive the data 13.

If a forecast of a possible impact of the tsunami is made, the responsible processing center 19, 21 provides a notification 22 to civil authority 23, such as a state or a local government agency, responsible for the area that the tsunami is forecasted to impact. While high-resolution computational tsunami forecast models have been developed that allow predicting whether a particular location, such as a particular hotel, will be flooded, notifications to civil authorities generally cover large areas of land without specificity to particular locations. As additional data 13 becomes available, additional notifications with updated forecasts are sent to the civil authority 23. Based on the received notifications, the civil authority decides whether to issue a tsunami warning or an evacuation order for the area that the civil authority affected.

Warnings and evacuation orders are still provided to the populace in ways that are remnants from an earlier technological era. Conventional forms of notification include broadcasting the orders and warnings via public communication channels such as a television 24, radio 25, sirens 26, as well as by using civil authority personnel 27 on foot. Unfortunately, spreading the warnings and orders in these ways requires the populace to either turn on a public communication channel, such as their TV 24 or radio 25, at a particular time, or be within earshot of a siren 41 or of civil authority personnel 27 when they are disseminating the warnings and orders. If a person has not performed one of these actions, that person may not be notified of the tsunami. Further, as the warnings and orders are not specific to a particular location, such as a particular hotel or a spot on the beach, people may not take such warnings and orders with full seriousness.

Figure 2:
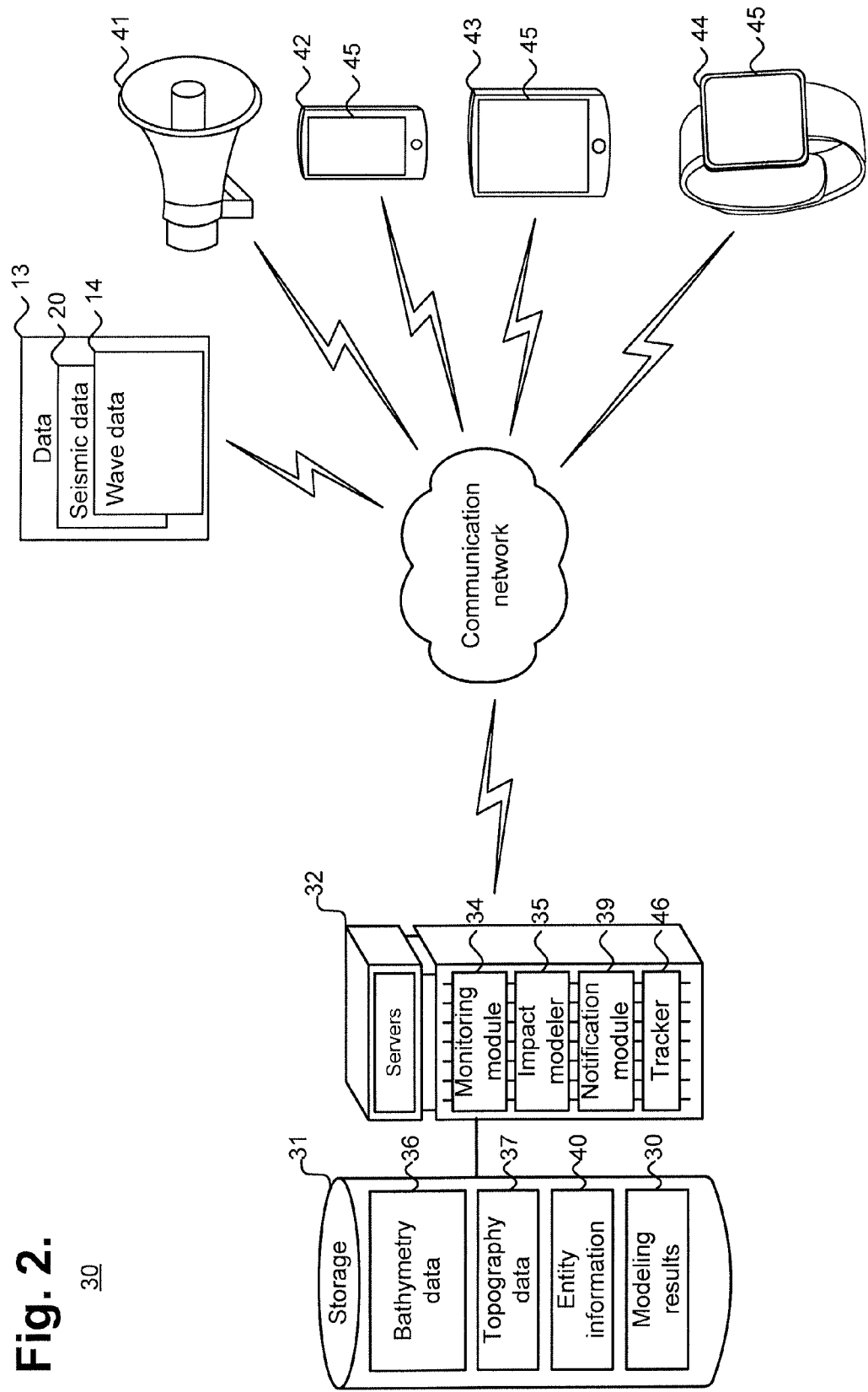
FIG. 2 is a block diagram showing a system for providing near real-time tsunami notification with the aid of a digital computer in accordance with one embodiment.

By providing location-specific tsunami notifications via mobile devices, the likelihood that a person will timely receive and act on one of these notifications increases. FIG. 2 is a block diagram showing a system for providing near real-time tsunami notification with the aid of a digital computer in accordance with one embodiment. The system 30 includes a computer storage 31 that can include one or more databases and is operatively coupled to one or more servers 32. The servers 32 are connected to a communication network 33, such as the Internet or a cellular network, though other kinds of communication networks 13 are possible.

The servers 32 execute a monitoring module 34 that monitors through the communication network 33 one or more information sources for appearance of data 13 associated with a presence of a tsunami in one or more bodies of water, such as an ocean, a sea, or a lake. The sources of information can include publicly available sources of information, such as webpages of government agencies that collect such data, such as NOAA or USGS or other agencies running processing centers 19, 21 though other kinds of information sources are possible. For example, instead of monitoring the publicly available sources of information, the monitoring module 34 could receive notifications of when such data 13 is obtained by the government agency.

The data 13 can include seismic data 20 and wave data 14, though other kinds of data 13 is possible. As explained above with reference to FIG. 1, the seismic data 20 describes underwater seismic events, such as earthquakes, landslides, and volcanic eruptions. Such data 20 is generally the first kind of data 13 that becomes available due to the speed of seismic wave propagation being greater than that of propagation of tsunami waves over water. Other kinds of seismic data 20 are possible. Other sources of seismic data are possible.

Note that such data 20 does not generally include whether seafloor displacement due to the seismic event was horizontal, which generally does not result in a tsunami that inundates coastal areas, or vertical, which can result in a tsunami inundates coastal areas, but nevertheless seismic data 20 is still valuable and can serve as a trigger in forecasting a possible tsunami.

The data 13 can further include wave data 14, data regarding waves in a body of water that is being monitored for an occurrence of a tsunami. Wave data 14 is used help determine degree of inundation. As tsunamis propagate faster in deeper water, the wave data 14 needs to be obtained from deep water measurements to allow a more accurate forecasting of the tsunami's arrival and impact. For example, such data can be DART® data made available by NOAA via NOAA's website. Other sources of the deep-water data exists. For example, Japan Agency For Marine-Earth Science and Technology operates a DENSE Ocean-floor Network System for Earthquakes and Tsunamis (DONET) that includes a network of underwater pressure gauges transmitting data through underwater fiber optic cables.

The servers 32 further execute an impact modeler 35 that forecasts a possible impact of the tsunami on particular locations in coastal areas using mathematical modeling. The impact modeler could also be implemented by an agency's server, such as NOAA's server, in which case the servers 32 merely rely on the forecast. The coastal area being evaluated can be defined using geographic coordinates, such as a particular length and width of a specific beach. The size of each location within that area that is evaluated can vary from a particular spot on the beach, a street block, or a hotel, and can depend on the forecasting resolution desired by, for example, the local government responsible for the location. While the computational costs of creating the forecast increase proportionally with the size of the coastal area being evaluated and the location-specific resolution of the forecast, to increase the speed with which the forecasting occurs, the modeler obtains some of the information required for the forecasting in advance. Thus, the modeler 35 first obtains bathymetry data describing the bathymetry of the seafloor, such as data describing underwater mountains and valleys, of the body of water in which the tsunami occurs. The bathymetry data 36 can be stored in the storage 11, accessible to the modeler 35, and pre-processed as required to be used to create a forecast a possible impact of a tsunami via a computational model, such as the MOST model described below. Similarly, the modeler 35 obtains topographic data 37 describing the topography of locations in the area being evaluated for being impacted by the tsunami. As new data is obtained, the impact modeler 35 can revise the forecast.

Seismic data 20 is usually the first kind of data available that can indicate an onset of a tsunami that has a seismic origin. While a forecast based on such data may be inaccurate due to differences between vertical and horizontal displacements, the finding of the seismic data 20 by the monitoring module 34 will trigger the modeler 35 to create an initial forecast of an impact of the tsunami caused by the earthquake based on the seismic data 20, the processed bathymetry data 36, as well as the topographic data 37 stored in the storage 31 describing the topography of the locations for which the impact is being modeled. The forecasting can be performed using one of the forecasting models described in Titov, V. V. (2009): The Sea, Chapter 12 "Tsunami Forecasting," Volume 15: Tsunamis, Harvard University Press, Cambridge, Mass. and London, England, 371-400, the disclosure of which is incorporated by reference. In particular, the Method of Splitting Tsunamis (MOST) model can be used, which is also described in Wei, Y., C. Chamberlin, V. Titov, L. Tang, and E. N. Bernard (2013): "Modeling of the 2011 Japan tsunami—Lessons for near-field forecast," Pure Appl. Geophys., 170(6-8), doi: 10.1007/s00024-012-0519-z, 1309-1331, the disclosure of which is incorporated by reference. Still other computational models can be used for the forecasting.

The results 38 of the modeling can include a forecast of the inundation zone of particular area—how far into the area the water will flood, which can be expressed as a line on a map of the area, and the time that the water will arrive in one or more locations in the area. From the inundation zone, the list of locations impacted by the area can be derived by the modeler 35. In one embodiment, a location is determined to be impacted if any amount of flooding occurs on that location, if the location is within the forecasted inundation zone; in a further embodiment, other criteria can be used to determine whether a location is impacted, such as a threshold water height in the inundated location. Other information can be derived as a result 38 of the modeling, such as the height and amplitude of the arriving waves.

As not all tsunamis are of seismic origin, the impact modeler 35 can use the wave data 14 to revise the initial forecast, or if, the tsunami is not of seismic origin, create forecast modeled on seismic data impact of the tsunami based on the wave data 14 only. The forecasting can be performed using one of the forecasting models described above, though still other models are possible. The results 38 of the modeling are also stored in the storage 31.

The servers 32 also execute a notification module 39 that provides notifications regarding a tsunami to one or more entities. The storage 31 stores information 40 regarding known entities that are associated with the system 30. As the system 30 does not need to notify all of the known entities to avoid spreading panic and raising false alarm, the notification module 39 identifies the entities associated with the locations forecasted to be impacted that as needing to be notified. These entities that may need to be notified can include individuals subscribing to the services provided by the system 30 for their personal safety and who are in a location forecasting to be impacted by the tsunami at the time of the modeling results 38 are available, such as people living in a particular coastal hotel ("individual subscribers"). In a further embodiment, the system 30 may identify individual subscribers who are proximate but not at the impacted locations as needing to be notified. Other entities to be notified include individuals associated with disaster response management ("disaster response personnel") in areas that include locations forecasted to be impacted by the tsunami, such as employees of local governments responsible for tsunami evacuation in the locations. Also, the entities to be notified can include devices 41 associated with disaster response or notification ("disaster response and notification devices") in locations modeled to be impacted, such as a siren in a particular location that calls for evacuation when turned on or a power generator responsible for providing power to a location when the central electrical grid is down. In a further embodiment, other kinds of entities to be notified of the modeled impact are possible.

The notification module 39 communicates with the disaster response personnel and the individual subscribers via mobile devices 42-44 associated with those entities that execute a dedicated mobile application 45. While the mobile devices 42-44 are shown with reference to FIG. 2 as smartphones 42, tablets 43, and smart-watches 44, other kinds of the mobile devices 42-44 capable of executing mobile applications and connecting to the communication network 33. Such application 45 can be provided to the individual subscribers by a local government of a coastal areas to facilitate emergency services, though other ways to obtain the application 45 are possible. As described below, different versions of the application 45 can executed on the mobile devices 42-44 of individual subscribers and on the mobile devices 42-44 of the disaster response personnel. In a further embodiment, the application 45 can run on devices other than the mobile devices 42-44, such as desktop computers (not shown). A still further version of the application can be ran on a computing device interfaced to the disaster response and notification devices 41 (not shown).

Information 40 about the entities that may need to be notified is stored in the storage 31 and can include the locations that disaster response personnel is responsible for and a location of a disaster response device 41. A location can also initially be associated with an individual subscriber, such as a location that the subscriber provide when setting up the application, as described further below, though a subscriber's real-time location would need to be obtained before identifying that subscriber as needing a notification. In addition, individual subscribers can share with the system 30 information about individuals connected to these subscribers, such as social network connections of the individual subscribers. Such connections can be stored as part of entity information 40. Still other kinds of entity information 40 are possible.

While the locations associated with disaster responses personnel and the devices are stored in advance of forecasting an impact of a tsunami, and the entity information 40 may also include locations previously associated with the subscriber, an individual subscriber's pinpoint location generally changes with time and is initially unknown to the servers 32. For example, a tourist in a coastal city may move between a beach that is forecasted to be flooded and a hotel on a hill forecasted to be out of the tsunami's reach, with the servers 12 not having the subscriber's exact position. Thus, prior to sending notifications to individual subscribers located in an area modeled to be impacted by the tsunami, the notification module 39 needs to determine which individual subscribers are in, or near, a location forecasted to be impacted. The notification module 39 can determine a present locations of an individual subscriber in several way.

One way the notification module 39 can determine which individual subscribers are in the locations to be impacted is using the infrastructure of mobile phone service providers, such as cellular towers, and that are part of the communication network 33. In particular, the notification module 39 can contact through the communication network 33 one or more cellular towers located within communication range of mobile devices that need to be notified of the tsunami. The notification module can use the cellular towers to send a message requesting a location of mobile devices 42-44 within range of the towers through the Wireless Disaster Alerts (WEA) communication channel. While all modern mobile devices, regardless of whether they are running the application 45, can receive messages through the WEA communication channel, only the mobile devices 42-44 executing the application 45 would be able to interpret the message. Upon receiving the message, the application 45 would obtain, if not already stored on the mobile device, the location of the mobile device 41 on which the application 42-44 is running, such as using a Wi-Fi positioning system or a Global Positioning System (GPS) receiver built into the mobile device 42-44. The application 42-44 would then connect to the communication network 33 and provide the location of the mobile device 42-44 associated with a particular individual subscriber to the notification module 39, which can store the location as part of entity information 40. The notification module 39 can use the entity information to identify those of the individual subscribers that need to be notified of the modeled tsunami impact.

In a further embodiment, the notification module 39 can contact through the communication network 33 the mobile devices 42-44 of all of the individual subscribers who previously indicated their location in an area whose portions are modeled to be impacted by the tsunami and request from the applications 45 running on the contacted devices the current location of the devices 42-44. For example, if a tsunami is modeled to flood portions of Honolulu, the notification module 39 can contact the mobile devices 42-44 of all of subscribers who indicated that they were in Honolulu when they downloaded the application 45. In a still further embodiment, the notification module 39 can contact through the communication network 33 all of the known individual subscribers and request the location of all of the contacted mobile devices 42-44.

When the notifications that are provided to particular entities and the content of such notifications depends on the kind of data 13 associated with the tsunami that has been obtained by the monitoring module 34. Regardless of the content, upon receiving the notification, the application 45, will alert the subscriber of received notification, such as through the use of sound, vibration, or light capabilities of the mobile device 45. As further described below beginning with reference to FIG. 6, a notification based only on forecasting performed using the seismic data 37, is provided only to the mobile devices 42-44 associated with the disaster response personnel. As mentioned above, seismic data 20 is not conclusive as to whether a tsunami flood a location, and providing the notification to individual subscribers could needlessly cause a false alarm that results in panic and decreases the trust in further notifications provided by the notification module 39. Likewise, a similar effect could be achieved by activating the disaster response and notification devices 41 in the absence of an actual tsunami in a location. However, providing the earliest possible notification to the disaster response personnel gives the disaster response personnel additional time to prepare in the event the tsunami will reach a location. Once the servers 32 obtain new data 13, such as wave data 14, and revise the forecast based on the new data, the notification module 12 would provide additional notifications to the disaster response personnel, and other entities.

Once the occurrence of the tsunami is confirmed using wave data 14, the notification module 39 provides the notifications of the tsunami to all of the identified entities. To deliver the notification as quickly as possible while the infrastructure necessary for the delivery is not yet damaged by the tsunami, the size of the notification is initially kept small. Thus, the notification to the mobile devices 42-44 of the individual subscribers can include only a vector line that can be applied to a map of the area where the individual subscriber is, showing how far into the analyzed area the water will flood, and the time of the water arrival to the position indicated by the line on the map. Based on the notification, the application can calculate the time that water will reach the subscriber's location using the subscriber's distance from the point represented by the line and the time water will reach the position represented by the line. The time to impact can be updated as the subscriber's position changes, such as when the subscriber starts running away from the water. The map of the area is retrieved by the application 45 using the communication network 33 and cached prior to receipt of the vector line to reduce the processing time and allow the application 45 to provide the notification to the subscriber even if connection to the communication network 33 is lost due to damage caused by the tsunami to the communication network 33 infrastructure. As further described below with reference to FIG. 7, the application 45 can apply the vector line to the map and present to the subscriber an advisory regarding his or her current location being within the flood zone and the time when the water will reach the location. The application 45 can further calculate using the map and present to the subscriber a shortest escape path to escape.

In addition, if the connection to the communication network 33 remains, the servers 32 can provide additional information to the subscribers. For example, the servers 32 further execute a tracker 46 that processes the received locations of the individual subscribers and for one or more of the individual subscribers, identifies the locations of the connections, such as social network connections, of those subscribers. The tracker 46 uses the locations of the connections to determine whether the connections are within the impacted locations and provides the results of the determination of to the subscribers.

The tracker 46 can also aggregate the location information, with the aggregated information being provided by the notification module 39 to the mobile devices 42-44 of the disaster response personnel. Thus, as further described with reference to FIG. 11, in addition to the vector line and the time of water arrival, the notification module 39 can provide to the application 45 running on the disaster response personnel mobile device 42-44 the number of individual subscribers in each location in the impacted area. The version of the application 45 running on the mobile device 42-44 of the disaster response personnel can obtain a map of the area 31 and display to the disaster personnel the modeled impact upon locations in the area shown by the map and the number of people in of the areas. While if the notification is based on only seismic data 20, the locations of the individual subscribers will not be available to the server 13, the notification module 39 can still provide to the application 45 running on the mobile device 45 the vector line, which the application 30 can apply to the map. The notification module 39 can also provide additional data to the both individual subscribers and the disaster response personnel regarding the actual and forecasted impact as long as the communication infrastructure remains intact.

The notification provided to the disaster response device 41 can vary on the nature of the device 41. For example, if the device 41 is a warning siren or a power generator, the notification can include a command to turn on. For other kinds of devices 41, other kinds of notifications are possible.

The servers 32 and the storage 31 can be implemented in a cloud-computing environment (not shown). In a further embodiment, the servers 32 and the storage can be in a centralized location, which can be maintained by a government agency or a third party. The servers 32 can include components conventionally found in programmable computing devices, such as one or more CPUs, memory, input/output ports, network interfaces, and non-volatile storage, although other components are possible. The servers 32 can each include one or more modules for carrying out the embodiments disclosed herein. The modules can be implemented as a computer program or procedure written as source code in a conventional programming language and that is presented for execution by the central processing unit as object or byte code. Alternatively, the modules could also be implemented in hardware, either as integrated circuitry or burned into read-only memory components, and each of the servers 32 can act as a specialized computer. For instance, when the modules are implemented as hardware, that particular hardware is specialized to perform the modeling and notification and other computers without the hardware cannot be used for that purpose. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 3:
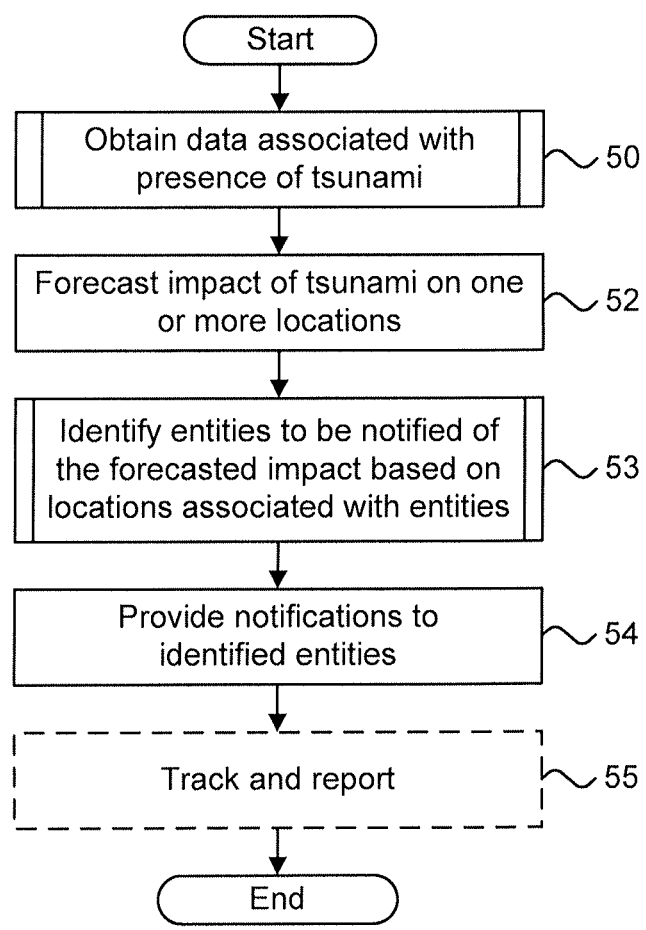
FIG. 3 is a flow diagram showing a method for providing near real-time tsunami notification with the aid of a digital computer in accordance with one embodiment.

Basing the impact modeling on near real-time data allows to deliver an up-to-date impact forecast to the subscriber. FIG. 3 is a flow diagram showing a method 50 for providing near real-time tsunami notification with the aid of a digital computer in accordance with one embodiment. The method 50 can be executed using the system 30 of FIG. 1. Near real-time data 13 associated with a presence of a tsunami in a particular body of water is obtained, as further described below with reference to FIG. 4 (step 51). A forecast of the possible impact of the tsunami indicated by the data 13 on locations within an area proximate to the body of water is modeled, as further described below with reference to FIG. 4 (step 52). Entities that need to be notified of the forecast are identified, as further described with reference to FIG. 5 (step 53). Notifications of the forecasted impact are provided to the identified entities (step 54). As described above with reference to FIG. 2, such notifications can include a vector line that can be applied by the application 42-44, 45 to a map of the area forecasted to be impacted by the tsunami and the time that the water will reach the position on the map represented by the line. Based on the vector line, the application 45 would provide to the entity the information regarding his location being impacted, the time to impact, and the shortest escape route to safety. Optionally, the location of the identified entities could be tracked by the servers 32 and reported to other entities, as further described above with reference to FIG. 2 (step 55), terminating the method 50.

The steps 52-54 can be repeated multiple times as new data 13 becomes available. Thus, if new data 13 becomes available, an additional forecast can be prepared, entities to be notified of the forecast are identified and notified of the revisions if the infrastructure for communication with the entities still remains intact.

Figure 4:
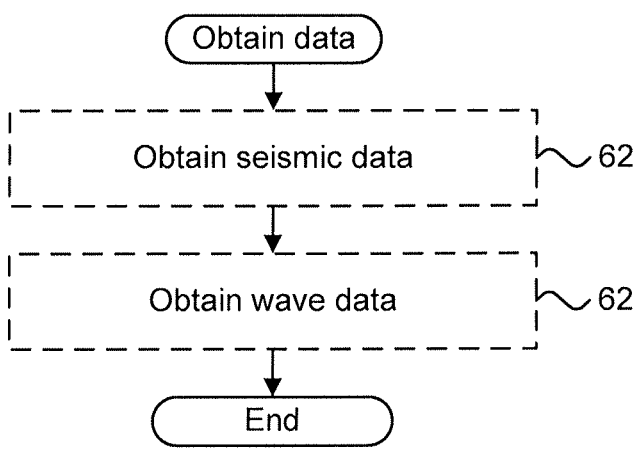
FIG. 4 is a flow diagram showing a routine for obtaining data associated with a tsunami for use in the method of FIG. 3 in accordance with one embodiment.

Tsunamis may be triggered by different types of events, such as underwater earthquakes, slumps, volcanic eruptions, asteroid impact and meteorological events. Accordingly, analysis of effects of tsunamis of varying origins requires different kinds of data. FIG. 4 is a flow diagram showing a routine 60 for obtaining data 13 associated with a tsunami for use in the method 50 of FIG. 3. Optionally, if the tsunami is of seismic origin, near real-time seismic data 13 that is associated with a tsunami (step 61). As described above, such data 13 can include information regarding a seismic event that could trigger a tsunami, but does not allow to predict whether the tsunami will be of a magnitude that could flood one or more locations within the area. As seismic waves propagate faster than water waves, the seismic data 20, if available, will be the first kind of data 13 associated with a tsunami that is obtained. The data 20 can be obtained by monitoring publicly available sources posting the data in near real-time, such as websites of government agencies, though other ways the sources can be obtained.

Further, optionally, near real-time wave data 14 associated with a presence tsunami is obtained (step 62), terminating the routine 60. If a tsunami was triggered by a seismic event such as an earthquake that was indicated by the seismic data, wave data 14 associated with the tsunami will also be obtained that can be used to confirm the existence of the tsunami indicated by the seismic data 20 and revise the modeled forecast of the tsunami's impact. If the tsunami is not of seismic origin, the wave data 14 will be the first kind of data associated with the tsunami that is received by the servers 32. Further, if the seismic data 20 was incorrect regarding the magnitude of the tsunami, the servers 32 could obtain no wave data 14. When collected, the wave data 14 can be obtained by monitoring publicly available sources posting the data in near real-time, such as NOAA website for DART stations data, though other ways to obtain the data are possible.

Figure 5:
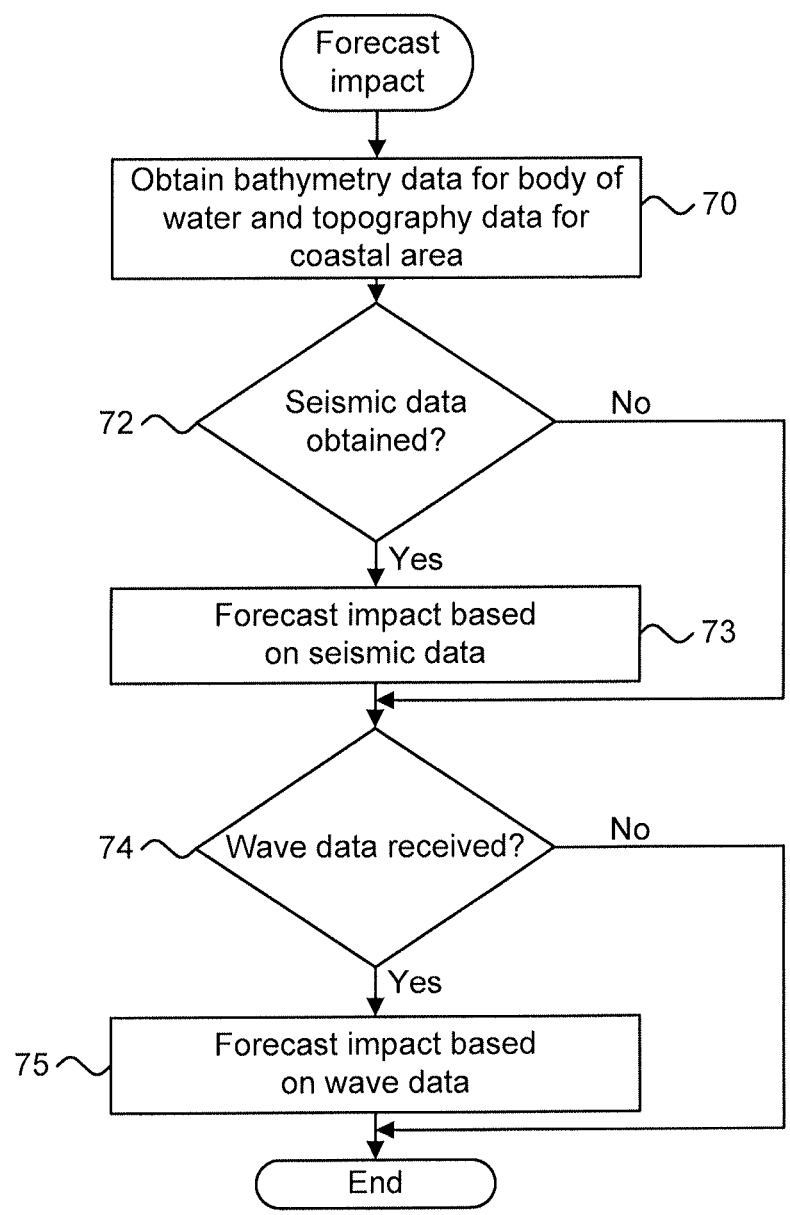
FIG. 5 is a flow diagram showing a routine for forecasting a possible location-specific impact of the tsunami for use in the method of FIG. 3 in accordance with one embodiment.

The obtained data 13 that is associated with a tsunami can be used by the servers 32 to forecast the possible impact of the tsunami. FIG. 5 is a flow diagram showing a routine 70 for forecasting a possible location-specific impact of the tsunami for use in the method 50 of FIG. 3 in accordance with one embodiment. Initially, prior to obtaining data 13 associated of a tsunami, bathymetry data 36 regarding the floor of the body of water being monitored for a tsunami and topography data 37 for the locations in the area being evaluated are obtained; such data 20 can be stored in the storage 31 and the bathymetry data is also pre-processed as required to be usable by the forecasting model, as described above with reference to FIG. 2 (step 71). In a further embodiment, the bathymetry data can obtained after the data 13 associated with a tsunami is obtained.

If seismic data 20 is obtained (step 72), the possible impact is forecasted based on the seismic data 37, the bathymetry data 36, and the topography data 37 regarding the locations that are evaluated for being impacted (step 73) and the routine progresses to step 74. If no seismic data is received (step 72), the routine 70 progresses to step 74. If wave data 14 is obtained (step 74), the impact is also forecasted based on based on the bathymetry data 36, the topography data 37, and the wave data 14 (step 65), terminating the routine 60. If no wave data is obtained (step 64), the routine 60 terminates.

Figure 6:
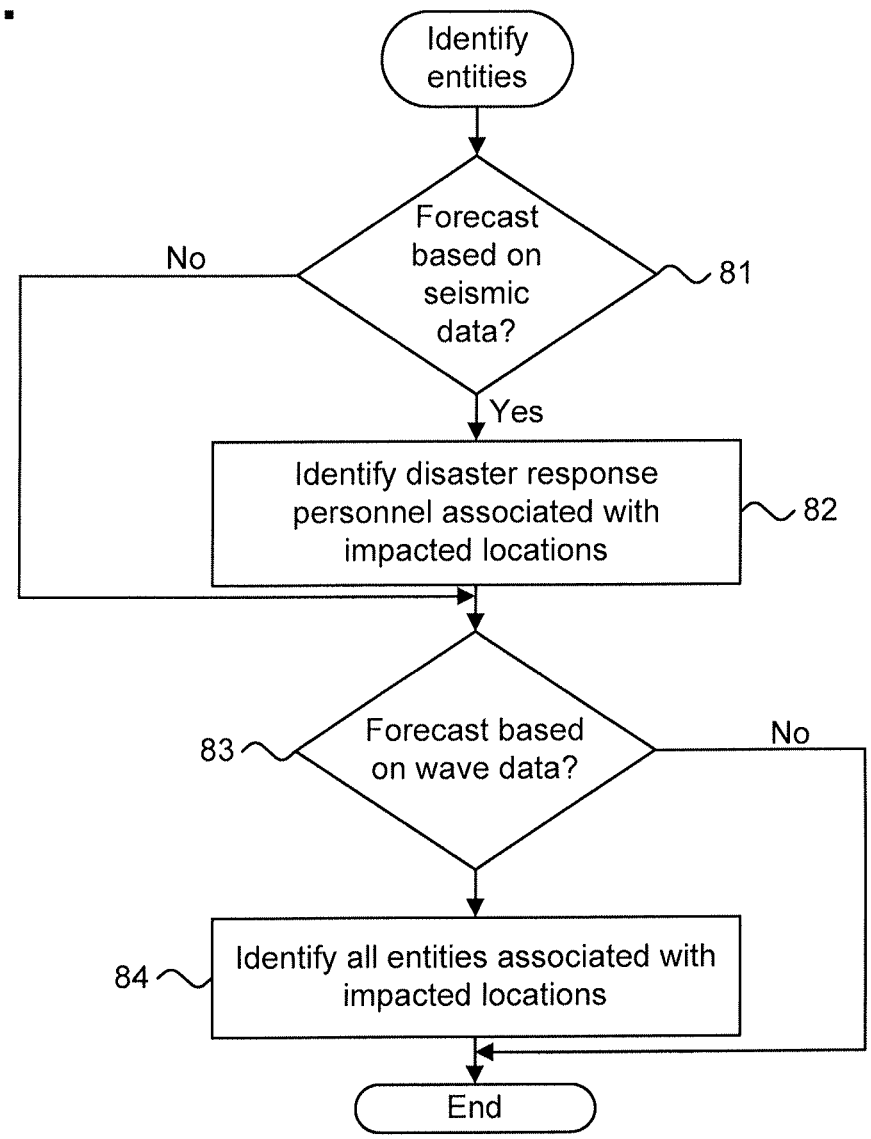
FIG. 6 is a flow diagram showing a routine for identifying entities to be notified of the forecasted impact for use in the method of FIG. 3 in accordance with one embodiment.

Which entities need to be notified of the forecasted impact depends on the type of data 13 used to create the forecast. FIG. 6 is a flow diagram showing a routine 80 for identifying entities to be notified of the forecasted impact for use in the method 50 of FIG. 3 in accordance with one embodiment. If the forecasted impact is modeled based on seismic data 20 and not wave data 14 (step 81), a list of impacted locations is compared to the locations associated with the disaster response personnel stored as part of entity information 40 and the disaster response personnel associated with the impacted locations is identified (step 82). As mentioned above, as the modeled impacts based on seismic data 20 may not be accurate, only the people responsible for disaster response are alerted to the forecast.

If the forecasted impact is based on wave data 14 (step 83), all of the entities that are associated with the impacted locations are identified (step 84), terminating the routine 80. Thus, all of the individual subscribers in the locations forecasted to be impacted (or in a further embodiment, within a predefined distance of the locations), the disaster response personnel responsible for the locations forecasted to be impacted, and the disaster response and notification devices 41 in the locations to be impacted are identified as needing to be notified. While the locations associated with disaster response personnel and the disaster response and notification devices 41 are known in advance of the execution of the method 40, the servers 32 need to determine whether the individual subscribers are currently in the impacted location before identifying those subscribers as needed to be notified of the forecasted impact. As described above with reference to FIG. 2, the individual subscribers located in sites that are forecasted to be impacted can be identified using cellular towers of local cellular service providers, or by contacting the mobile devices 42-44 of the individual subscribers through the communication network 33.

Figure 7:
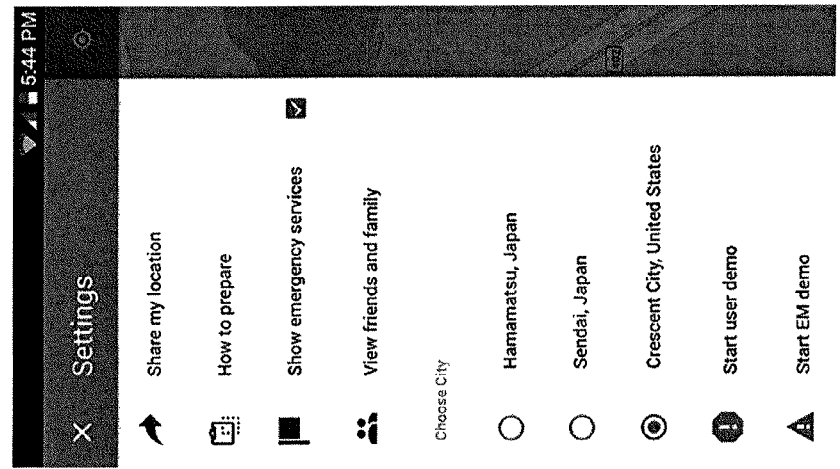
FIG. 7 is a screen shot showing, by way of example, of an advisory notifying an individual subscriber of the forecasted impact that is presented by application running on the mobile device of the individual subscriber.

The system 30 uses a combination of the servers 32 and the applications 45 running on the mobile devices 42-44 to interface with individual subscribers and disaster response personnel serviced by the system 30. The notification provided by the servers 32 to the mobile application 45 can be a small amount of data, such as a vector line applicable to a map, which can be quickly transmitted to the mobile devices 42-44 of the entities before communication infrastructure is damaged by the tsunami. The application 45 can compute additional information based on the received notification, such as computing an evacuation route, and present the notification as part of an advisory regarding the tsunami that can be easily understood by the entity associated with the device 42-44. FIG. 7 is a screen shot 90 showing, by way of example, of an advisory notifying an individual subscriber of the forecasted impact that is presented by application 45 running on the mobile device of an individual subscriber. The presented advisory includes a map of the area that includes the current location of the mobile device 42-44 associated with the individual subscriber (and presumably the location of the individual subscriber). A portion of the map that is forecasted to be flooded is represented differently from other portions of the map, in this case, looking as if covered by water, thus letting the subscriber know which locations in the area that he or she is in will be inundated. The advisory further includes a time remaining until the tsunami reaches the current location of the individual subscriber and an evacuation route that the individual subscriber can take to escape the area that is forecasted to be inundated. The application 45 can present the evacuation route as a series of driving or walking directions that the individual subscriber can follow. In addition, the application presents to the subscriber on the map locations of emergency services, such as fire stations that the individual may find useful. The application 45 can obtain the emergency services locations and the evacuation route using the communication network 33. Still other information could be presented as part of the advisory.

Figure 8:
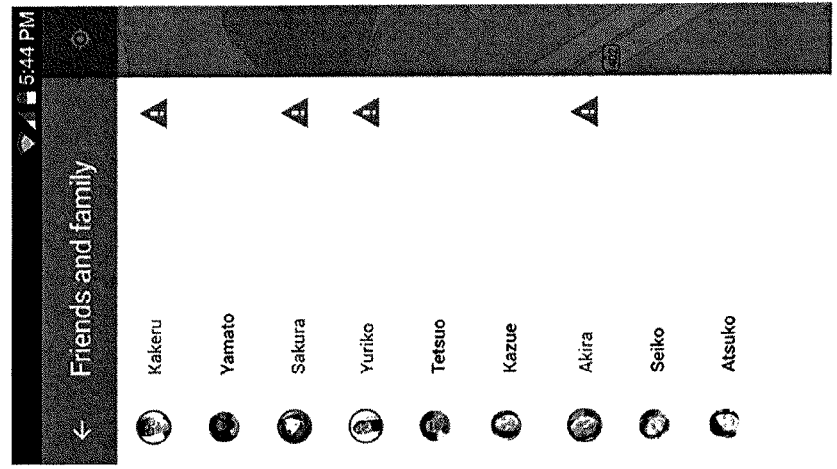
FIG. 8 is a screen shot showing, by way of example, a user interface of the application presenting statuses of connections of an individual subscriber.

As mentioned above with reference to FIG. 2, the servers 32 can track the locations of connections, such as social network connections, of individual subscribers and communicate to the application 45 whether these connections are within the inundation zone or not. The application 45 can present the communicated data to the subscriber. FIG. 8 is a screen shot 100 showing, by way of example, a user interface of the application 45 presenting statuses of connections of an individual subscriber. The application 45 presents an identification of the subscriber as well as an icon representing whether the subscriber is within the present or forecasted inundation zone. Other ways to present the status are possible. This feature of the application allows an individual subscriber to find out about that subscriber's friends and family without having to spend time and resources trying to contact them.

Figure 9:
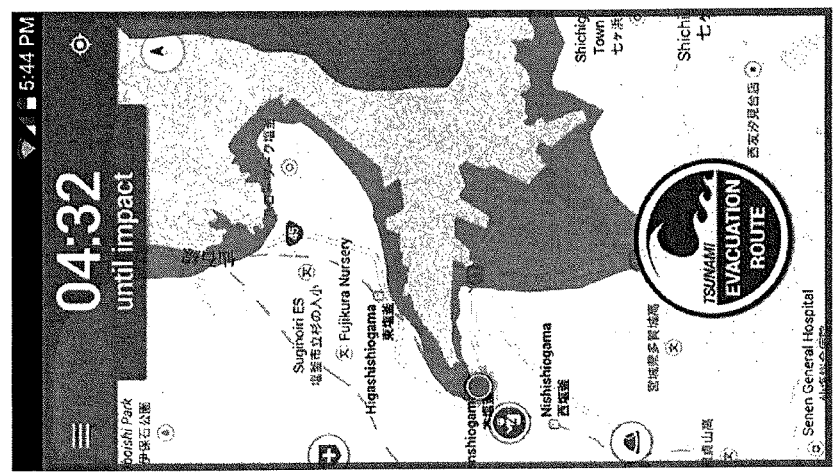
FIG. 9 is a screenshot showing, by way of example, a user interface for adjusting settings of the application.

The application 45 further allows the individual subscriber significant control over the subscriber's experience with the system 30 by controlling the settings of the application 45. FIG. 9 is a screenshot 110 showing, by way of example, a user interface for adjusting settings of the application 45. In particular, the individual subscriber can control whether the subscriber's location is shared with other entities using the system, such as disaster response personnel or social network connections of that subscriber. The individual subscriber can also choose whether the advisory will show locations of the emergency services on the map, though controlling other features of the advisory is also possible in a further embodiment. In addition, the subscriber can choose to view and edit the list of entities listed as friends and family by the application 45.

While the servers 32 need to establish a real-time location of a subscriber prior to issuing a notification, the subscriber can enter through the settings the city in which that subscriber currently resides, which can be used to establish the subscriber's real-time location as described above with reference to FIG. 2. Finally, the individual subscriber can use the setting to initiate a demonstration of what happens when a tsunami notification is received, as further described below with reference to FIG. 10. The subscriber can also select to view a demonstration of the version of the application 45 that runs on mobile devices of the disaster response personnel ("EM demo").

Figure 10:
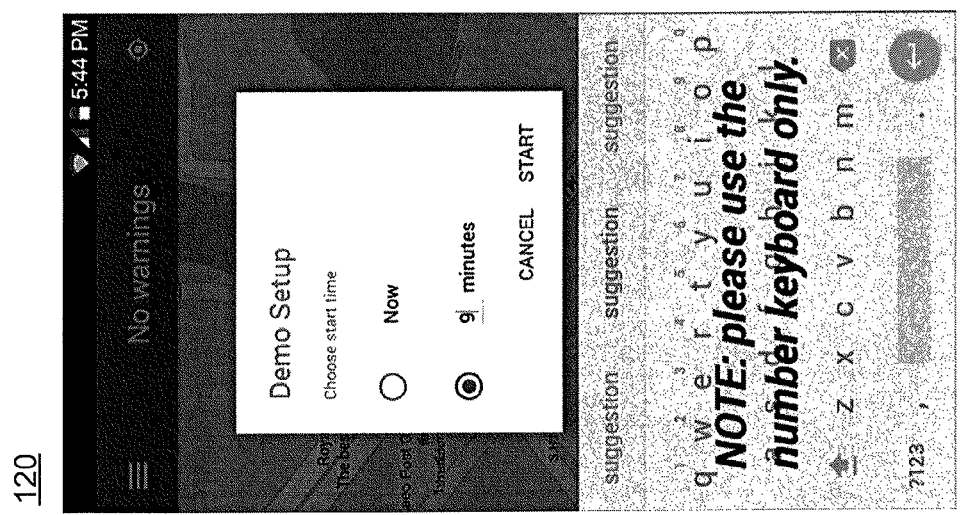
FIG. 10 is a screenshot showing, by way of example, a user interface of the application for initiating a simulation of a receipt of a tsunami notification.

FIG. 10 is a screenshot 120 showing, by way of example, a user interface of the application 45 for initiating a simulation of a receipt of a tsunami notification. Conducting the simulation allows the individual subscriber to familiarize himself or herself with different features of the application 45 prior to an actual tsunami. As seen in the screenshot 120, the subscriber can select when to start the demonstration, though other parameters of the demonstration that the subscriber can control are also possible.

Figure 11:
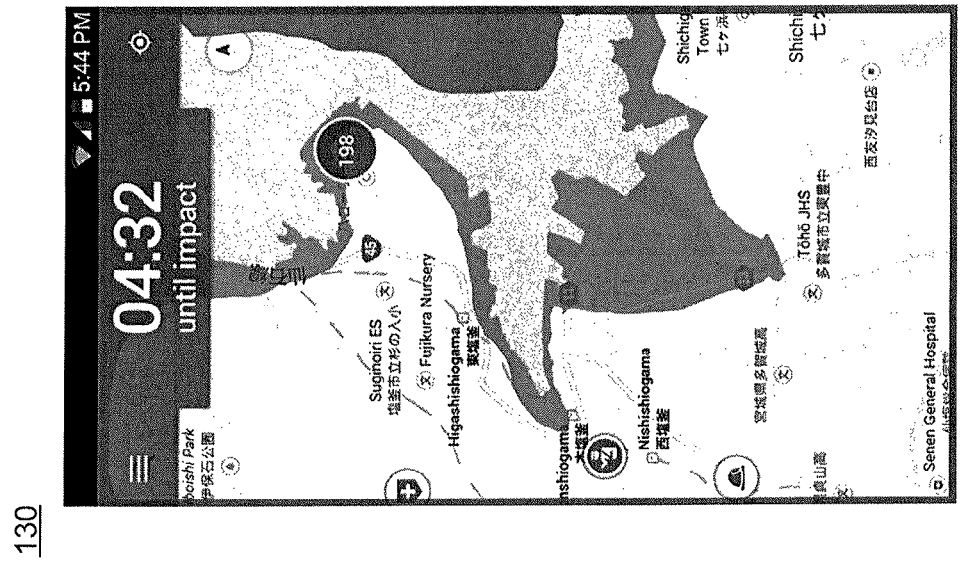
FIG. 11 is a screenshot showing, by way of example, an advisory presented by the application running on the mobile devices of disaster response personnel.

As mentioned above, the application 45 running on the mobile devices 45 of the disaster response personnel can display additional data that is not presented to the individual subscriber. FIG. 11 is a screenshot 130 showing, by way of example, an advisory presented by the application 45 running on the mobile devices 42-44 of disaster response personnel. While otherwise similar to the advisory shown by the application 45 described above, the application 45 can receive from the servers 32 additional information and display the information as part of the advisory. For example, the servers 32 can track the number of individual subscribers in particular locations that are impacted or forecasted to be impacted by the tsunami and the application 45 can display the locations and the numbers of subscribers on the map, thus allowing the emergency personnel to plan tsunami relief efforts.

While the invention has been particularly shown and described as referenced to the embodiments thereof, those skilled in the art will understand that the foregoing and other changes in form and detail may be made therein without departing from the spirit and scope of the invention.

What is claimed is:

1. A system for providing individualized tsunami notifications with the aid of a digital computer, comprising:
    a mobile application configured to execute on a mobile device, the mobile application comprising:
        a request receipt module configured to receive a request for a location of the mobile device;
        a location module configured to provide the location via a communication network to at least one server;
        a receipt module configured to receive via the communication network a notification of a possible forecasted tsunami impact on an area that comprises the provided location, the notification comprising a vector line applicable to a map of the area and describing a portion of the area forecasted to be impacted when applied to the map;
        an application module configured to apply the vector line to the map and represent on the map the portion of the area forecasted to be impacted;
        a calculation module configured to calculate by the mobile application when the location is forecasted to be impacted; and
        a presentation module configured to present via the mobile device the representation of the portion of the area forecasted to be impacted and when the location is forecasted to be impacted.

2. A system according to claim 1, further comprising:
    a list module configured to receive from a user associated with the mobile device a list of entities; and
    a display module configured to display an identifier of each of the entities and an identifier of whether that entity is located in the portion of the area forecasted to be impacted.

3. A system according to claim 1, further comprising:
    a receipt module configured to receive from a user associated with the mobile device an instruction to share the location of the mobile device with one or more entities comprising one or more of disaster response personnel and social network connections of the user.

4. A system according to claim 1, wherein the request is received from a cellular tower within a range of the location of the mobile device.

5. A system according to claim 1, further comprising:
    a locality module configured to receive, prior to the receipt of the request, from a user associated with the mobile device a locality in which the user is located, wherein the locality comprises at least a portion of the area forecasted to be impacted and the notification is received via the communication network.

6. A system according to claim 1, further comprising:
a retrieval module configured to retrieve the map using the communication network prior to the receipt of the notification; and
a cache module configured to cache the map.

7. A system according to claim 1, further comprising:
an evacuation module configured to determine an evacuation route from the portion of the area forecasted to be impacted;
an emergency services module configured to obtain locations of one or more emergency services in the area;
a display module configured to display the evacuation route and the emergency services locations via the mobile device.

8. A system according to claim 7, wherein the evacuation route comprises one or more of a series of walking directions and a series of driving directions.

9. A system according to claim 7, further comprising:
a user selection module configured to receive user instructions to display the emergency services locations.

10. A system according to claim 1, further comprising:
a time module configured to receive from a user associated with the mobile device a time to start a simulation of a receipt of the notification; and
a simulation module configured to perform the simulation upon reaching the time.

11. A method for providing individualized tsunami notifications with the aid of a digital computer, comprising the steps of:
receiving by a mobile application executing on a mobile device a request for a location of the mobile device;
providing by the mobile application the location via a communication network to at least one server;
receiving by the mobile application via the communication network a notification of a possible forecasted tsunami impact on an area that comprises the provided location, the notification comprising a vector line applicable to a map of the area and describing a portion of the area forecasted to be impacted when applied to the map;
applying by the mobile application the vector line to the map and representing on the map the portion of the area forecasted to be impacted;
calculating by the mobile application a time when the location is forecasted to be impacted; and
presenting by the mobile application via the mobile device the representation of the portion of the area forecasted to be impacted and when the location is forecasted to be impacted.

12. A method according to claim 11, further comprising:
receiving by the mobile application from a user associated with the mobile device a list of entities; and
displaying on the mobile device an identifier of each of the entities and an identifier of whether that entity is located in the portion of the area forecasted to be impacted.

13. A method according to claim 11, further comprising:
receiving by the mobile application from a user associated with the mobile device an instruction to share the location of the mobile device with one or more entities comprising one or more of disaster response personnel and social network connections of the user.

14. A method according to claim 11, wherein the request is received from a cellular tower within a range of the location of the mobile device.

15. A method according to claim 11, further comprising:
receiving, prior to the receipt of the request, by the mobile application from a user associated with the mobile device a locality in which the user is located,
wherein the locality comprises at least a portion of the area forecasted to be impacted and the notification is received via the communication network.

16. A method according to claim 11, further comprising:
retrieving by the mobile application the map using the communication network prior to the receipt of the notification; and
caching by the mobile application the map.

17. A method according to claim 11, further comprising:
determining an evacuation route from the portion of the area forecasted to be forecasted to be impacted;
obtaining locations of one or more emergency services in the area;
displaying the evacuation route and the emergency services locations via the mobile device.

18. A method according to claim 17, wherein the evacuation route comprises one or more of a series of walking directions and a series of driving directions.

19. A method according to claim 11, further comprising:
receiving by the mobile application from a user associated with the mobile device a time to start a simulation of a receipt of the notification; and
performing the simulation upon reaching the time.

20. A non-transitory computer readable storage medium storing code for executing on the monitor recorder to perform the method according to claim 11.

* * * * *